(12) United States Patent
Karn

(10) Patent No.: US 9,120,010 B2
(45) Date of Patent: Sep. 1, 2015

(54) TOUCHSCREEN GAME ALLOWING SIMULTANEOUS MOVEMENT OF MULTIPLE ROWS AND/OR COLUMNS

(75) Inventor: Jeffrey D. Karn, Warrington, PA (US)

(73) Assignee: Megatouch, LLC, Bristol, PA (US)

( * ) Notice: Subject to any disclaimer, the term of this patent is extended or adjusted under 35 U.S.C. 154(b) by 1053 days.

(21) Appl. No.: 12/845,514

(22) Filed: Jul. 28, 2010

(65) Prior Publication Data
US 2011/0136572 A1 Jun. 9, 2011

Related U.S. Application Data

(60) Provisional application No. 61/266,362, filed on Dec. 3, 2009.

(51) Int. Cl.
*A63F 9/24* (2006.01)
*A63F 13/00* (2014.01)
*G07F 17/32* (2006.01)

(52) U.S. Cl.
CPC ............... *A63F 13/00* (2013.01); *G07F 17/32* (2013.01); *G07F 17/3269* (2013.01); *A63F 2300/1075* (2013.01); *A63F 2300/61* (2013.01); *A63F 2300/638* (2013.01)

(58) Field of Classification Search
CPC ....... A63F 13/00; A63F 13/005; A63F 13/06; A63F 13/20; A63F 13/21; A63F 13/214; A63F 13/2145; A63F 13/40; A63F 13/42; A63F 13/822; A63F 9/08; A63F 9/10; A63F 9/12; A63F 9/24; A63F 2300/10; A63F 2300/1068; A63F 2300/1075; A63F 2300/308; A63F 2300/6045; A63F 2300/609; A63F 2300/61; A63F 2300/807

USPC ......... 463/7, 9–10, 16–20, 25, 29, 30–31, 36, 463/42; 273/138.1, 139, 153 R, 153 S, 153 J; 345/156, 173
See application file for complete search history.

(56) References Cited

U.S. PATENT DOCUMENTS

| 4,863,172 A | 9/1989 | Rosenwinkel et al. |
| 5,417,425 A | 5/1995 | Blumberg et al. |
| 5,769,716 A * | 6/1998 | Saffari et al. ................... 463/20 |
| 6,458,032 B1 * | 10/2002 | Yamagami ....................... 463/9 |

(Continued)

OTHER PUBLICATIONS

"iPhone Application—Chuzzle" by InstallerApps. YouTube—BroadcastYourself. [dated Mar. 10, 2008], [online], [retrieved on Jan. 26, 2011]. <URL: http://www.youtube.com/watch?v=rH5CaA3h7Ec>. Including Still Image of Video. 2 pages.*

(Continued)

*Primary Examiner* — Milap Shah
(74) *Attorney, Agent, or Firm* — Panitch Schwarze Belisario & Nadel LLP

(57) ABSTRACT

An electronic game playable in an amusement device having a display with a touchscreen configured to receive a plurality of touch inputs simultaneously includes a playing area having a plurality of rows and a plurality of columns which form a grid having a plurality of gaming spaces and game objects disposed within each gaming space. The player is permitted to select and move a plurality of game objects each in different rows or columns simultaneously. A match is achieved when a predefined number of game objects having a same first identifier selected from a predetermined set of first identifiers are in adjacent gaming spaces within a row or column.

12 Claims, 3 Drawing Sheets

(56) References Cited

U.S. PATENT DOCUMENTS

| | | | |
|---|---|---|---|
| 6,910,962 B2* | 6/2005 | Marks et al. | 463/16 |
| 7,144,322 B2* | 12/2006 | Gomez et al. | 463/20 |
| 7,254,775 B2 | 8/2007 | Geaghan et al. | |
| 7,411,575 B2* | 8/2008 | Hill et al. | 345/156 |
| 7,578,738 B2* | 8/2009 | Cregan et al. | 463/20 |
| 7,631,872 B2 | 12/2009 | Roemer et al. | |
| 7,722,452 B2* | 5/2010 | Miura et al. | 463/9 |
| 7,749,082 B2* | 7/2010 | Dunaevsky et al. | 463/32 |
| 7,775,866 B2* | 8/2010 | Mizuguchi et al. | 463/9 |
| 2003/0040350 A1* | 2/2003 | Nakata et al. | 463/9 |
| 2003/0045345 A1* | 3/2003 | Berman | 463/20 |
| 2003/0092480 A1* | 5/2003 | White et al. | 463/20 |
| 2003/0157981 A1* | 8/2003 | Marks et al. | 463/20 |
| 2004/0033829 A1* | 2/2004 | Pacey et al. | 463/20 |
| 2004/0043809 A1* | 3/2004 | Gomez et al. | 463/16 |
| 2004/0097280 A1* | 5/2004 | Gauselmann | 463/16 |
| 2004/0127276 A1* | 7/2004 | Moody | 463/13 |
| 2005/0043075 A1 | 2/2005 | Lin et al. | |
| 2005/0054436 A1* | 3/2005 | Frizzell et al. | 463/25 |
| 2007/0152984 A1* | 7/2007 | Ording et al. | 345/173 |
| 2007/0279394 A1 | 12/2007 | Lampell et al. | |
| 2008/0132333 A1 | 6/2008 | Kogo | |
| 2008/0165132 A1* | 7/2008 | Weiss et al. | 345/173 |
| 2008/0194326 A1* | 8/2008 | Brunet De Courssou et al. | 463/31 |
| 2009/0143141 A1* | 6/2009 | Wells et al. | 463/37 |
| 2009/0191946 A1* | 7/2009 | Thomas et al. | 463/20 |
| 2009/0253505 A1* | 10/2009 | Ogawa et al. | 463/31 |
| 2009/0275372 A1 | 11/2009 | Prucey | |
| 2009/0313567 A1* | 12/2009 | Kwon et al. | 715/769 |
| 2009/0325691 A1* | 12/2009 | Loose | 463/30 |
| 2010/0113140 A1* | 5/2010 | Kelly et al. | 463/25 |
| 2010/0120505 A1* | 5/2010 | Caputo et al. | 463/20 |
| 2010/0130280 A1* | 5/2010 | Arezina et al. | 463/20 |
| 2010/0285881 A1* | 11/2010 | Bilow | 463/37 |

OTHER PUBLICATIONS

"iPhone (original)". From Wikipedia, The Free Enclyopedia. [online], [retrieved on Jan. 26, 2011]. Retrieved from the Internet <URL: http://en.wikipedia.org/wiki/IPhone_(original)>. 7 pages.*

"Chuzzle". From Wikipedia, The Free Enclyopedia via the Way Back Machine (www.archive.org). [dated Dec. 7, 2007], [online], [retrieved on Jan. 26, 2011]. Retrieved from the Internet <URL: http://web.archive.org/web/20071209203925/http://en.wikipedia.org/wiki/Chuzzle>. 4 pages.*

"Trism". From Wikipedia, The Free Enclyopedia. [online], [retrieved on Jan. 26, 2011]. Retrieved from the Internet <URL: http://en.wikipedia.org/wiki/Trism>. 3 pages.*

* cited by examiner

TOUCHSCREEN GAME ALLOWING SIMULTANEOUS MOVEMENT OF MULTIPLE ROWS AND/OR COLUMNS

CROSS-REFERENCE TO RELATED APPLICATIONS

This application claims the benefit of U.S. Provisional Patent Application No. 61/266,362, filed on Dec. 3, 2009, entitled "Touchscreen Game Allowing Simultaneous Movement of Multiple Rows and/or Columns," the entire contents of which are incorporated by reference herein.

BACKGROUND OF THE INVENTION

Electronic games for computers and touchscreen or other types of amusement devices are generally known. New variations of games which are more fast paced and require the player to strategize are currently sought after. It is therefore desirable to provide a game that enables faster gameplay by the player and requires more complex strategies.

BRIEF SUMMARY OF THE INVENTION

Briefly stated, an embodiment of the present invention comprises an electronic game playable in an amusement device having a display. The display includes a touchscreen configured to simultaneously receive a plurality of touch inputs. The game includes a playing area within the display. The playing area includes a plurality of rows and a plurality of columns which form a grid having a plurality of gaming spaces. The game also includes a plurality of game objects. Each of the plurality of game objects has a first identifier selected from a predetermined set of first identifiers. One of the plurality of game objects is disposed within each of the gaming spaces. A set of rules dictates playing of the electronic game. The rules include selecting at least one of the plurality of game objects and moving the selected game object from a first gaming space to a second gaming space within the same row or column as the first gaming space. The unselected game objects which are disposed in gaming spaces in the same row or column are automatically moved a corresponding number of gaming spaces within the same row or column as the selected game object. The player is permitted to select and move a plurality of game objects which are disposed within the plurality of gaming spaces in different rows or columns simultaneously. A match is achieved when a predefined number of game objects having the same first identifier are disposed in adjacent spaces within a common row or column. The game objects in the adjacent spaces are automatically cleared and the cleared game objects are replaced with new game objects, each new game object having a first identifier selected from the predetermined set of first identifiers.

BRIEF DESCRIPTION OF THE DRAWINGS

The foregoing summary, as well as the following detailed description of preferred embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE INVENTION

Certain terminology is used in the following description for convenience only and is not limiting. The words "a" and "an", as used in the claims and in the corresponding portions of the specification, mean "at least one." Further, the terms "coin" or "currency" should not be construed as limiting and can be used herein to mean all forms of coin and paper currency from any country as well as proprietary tokens, game cards, credit cards, debit cards, chits, or other representative forms of credit and/or payment.

Figure 1A:
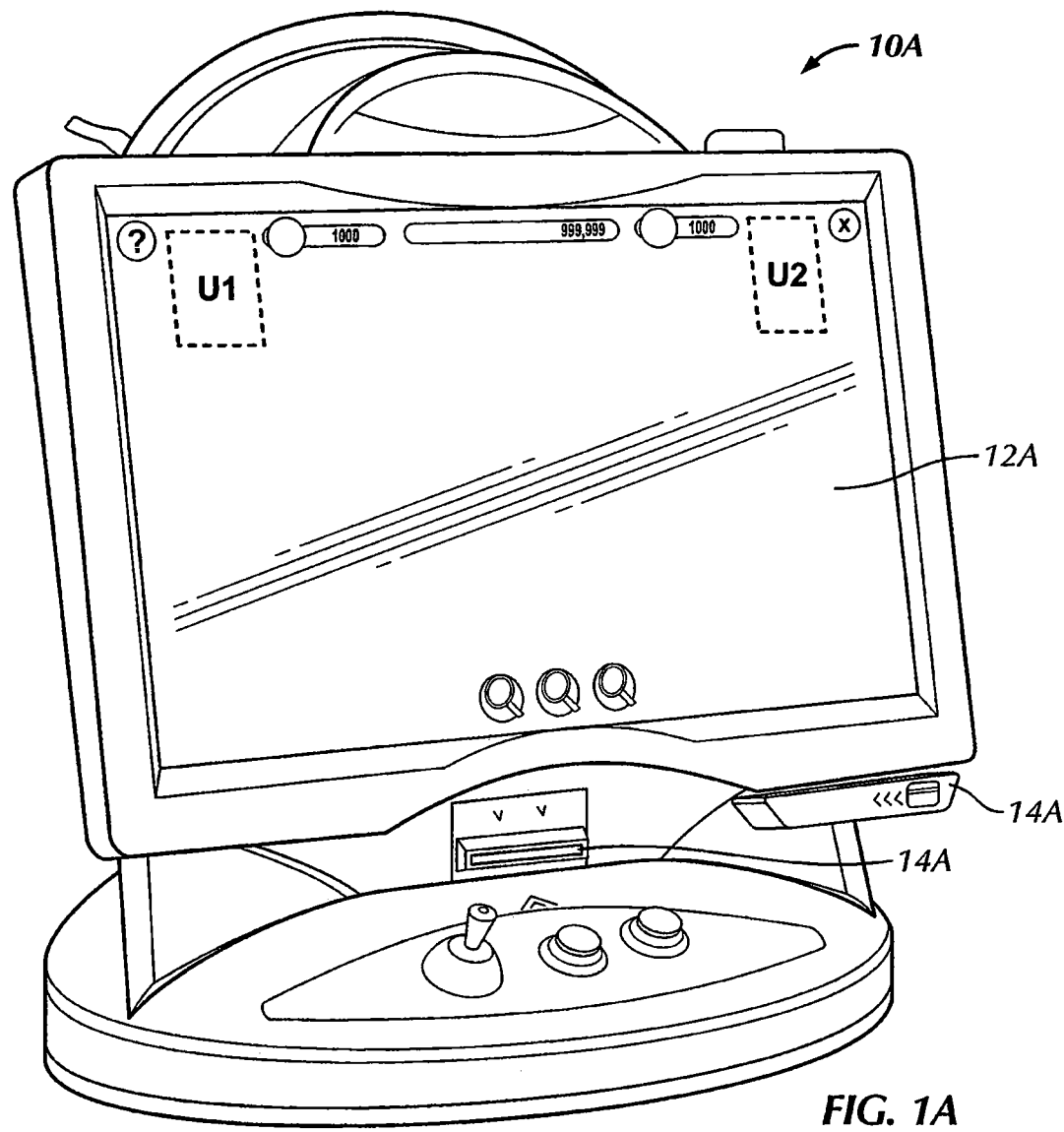
FIG. 1A is a perspective view of an amusement device in accordance with a first preferred embodiment of the present invention.

Referring to the drawings in detail, wherein like reference numerals indicate like elements throughout, FIG. 1A shows a first preferred embodiment of an amusement device 10A. The amusement device 10A includes a controller U1 and a memory U2. The memory U2 can be any known or suitable memory device, such as random access memory (RAM), read only memory (ROM), flash RAM, hard disk, optical disk, or the like. The amusement device 10A further includes a video display 12A that is operatively connected to the controller U1. The amusement device 10A also includes at least one input component 14A that receives value in order to establish one or more playable credits. The value received may be at least one of currency, coins, tokens, chits, credits, credit cards/debit cards or the like. Although only one input component 14A is shown, the amusement device 10A may include more than one input component 14A to give a user an option for payment, for permitting multiple players, or the like. Preferably, the amusement device 10A is made operable upon actuation of the input component 14A. For example, the user may only select and play an electronic game once value is received at the input component 14A and/or one or more playable credits are issued to the user. However, free selections may be offered at the discretion of an operator of the amusement device 10A.

Figure 1B:
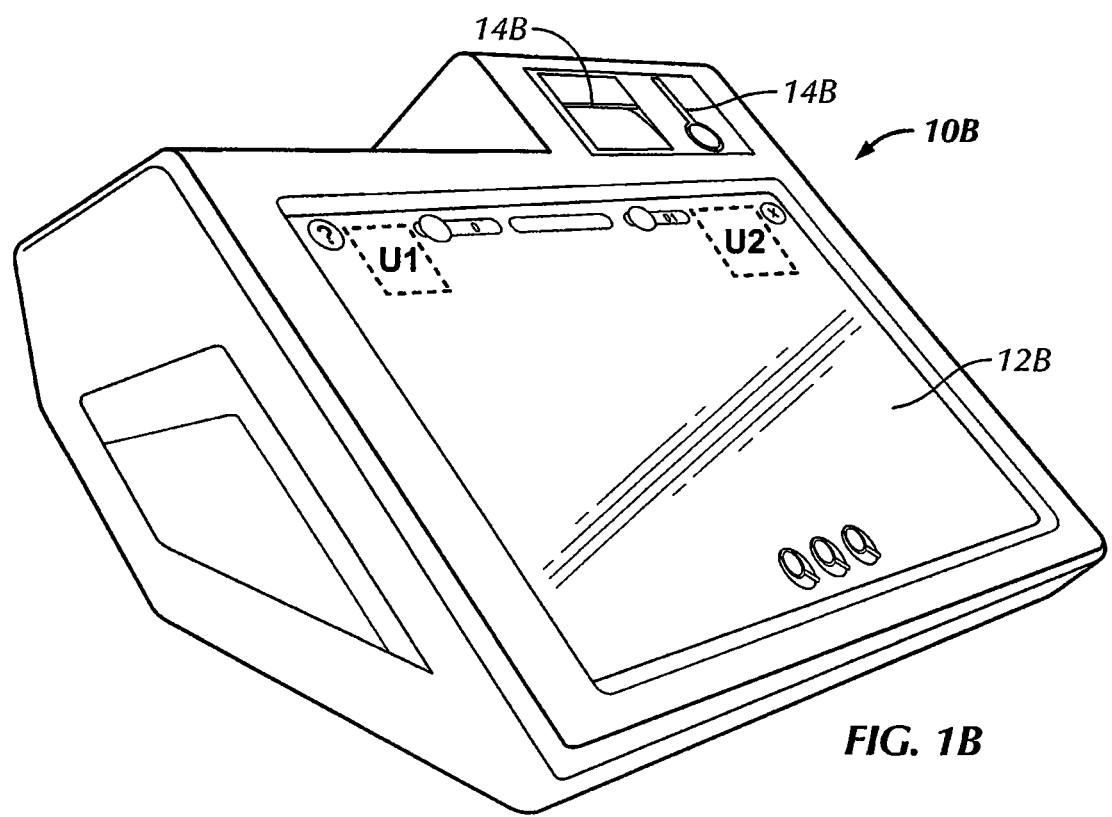
FIG. 1B is a perspective view of an amusement device in accordance with a second preferred embodiment of the present invention.

FIG. 1B shows another or second amusement device 10B in accordance with a second preferred embodiment of the present invention. The second amusement device 10B also includes a controller U1, a memory U2, a display 12B, and an input component 14B. Preferably, the video displays 12A, 12B are touchscreen video displays configured to accept touch input. The first amusement device 10A is a free-standing or floor-standing apparatus, whereas the second amusement device 10B is a table-top or counter-top apparatus. However, the amusement devices 10A, 10B may be arranged in any configuration including table mount, wall mount, pole mount, and the like.

For convenience, the amusement devices 10A, 10B will be referred to hereinafter simply as "amusement device 10."

Turning now to the operation of the amusement device 10, the memory U2 stores one or more application programs, such as electronic games, a music or video jukebox program, or the like, and a system control program. However, the one or more application programs may also be stored remotely. The controller U1 controls the touchscreen display 12 based upon the system control program retrieved from the memory U2 and based upon inputs from the touchscreen display 12. As used herein, the system control program refers to all of the software functions outside of the application program files including an operating system, display control, input control, sound drivers, and the like. Other input devices which may be connected to the amusement device 10 include a pushbutton (s), a trackball or touchpad, a mouse, a joy-stick, a foot-pedal, a voice recognition system, a keypad or keyboard, and the like. Preferably, however, the input device is the touchscreen display 12.

The amusement device 10 includes an operating mode and a setup mode. When the operating mode is selected, a player or user is selectively permitted to access the application programs. When the setup mode is selected, the owner/operator is permitted to make system setup adjustments. To switch from the operating mode to the setup mode, a mode selector pushbutton (hardware not shown) is provided that is typically concealed from the users. The mode selector pushbutton may be implemented as a hidden software feature, but preferably the mode selector pushbutton is a simple pushbutton that is disposed inside a housing of the amusement device 10. In the setup mode, the owner/operator may also make adjustments to the game features as will be described in greater detail hereinafter.

In the preferred embodiments of the present invention, the controller U1 controls the display 12 based upon the system control program retrieved from the memory U2 and based upon inputs of the user. The display 12 preferably has a "widescreen" aspect ratio. Such ratios may include, for example, 16:9, 16:10, 1.85:1, 2.35:1, or the like. The touchscreen display 12 is also preferably configured to receive a plurality of touch inputs simultaneously, i.e., one or more users may touch the display 12 in multiple locations simultaneously and have the data associated with each of the touches be accepted. The touchscreen display 12 is therefore of the projected capacitive type or the like for supporting multi-touch input.

Figure 2:
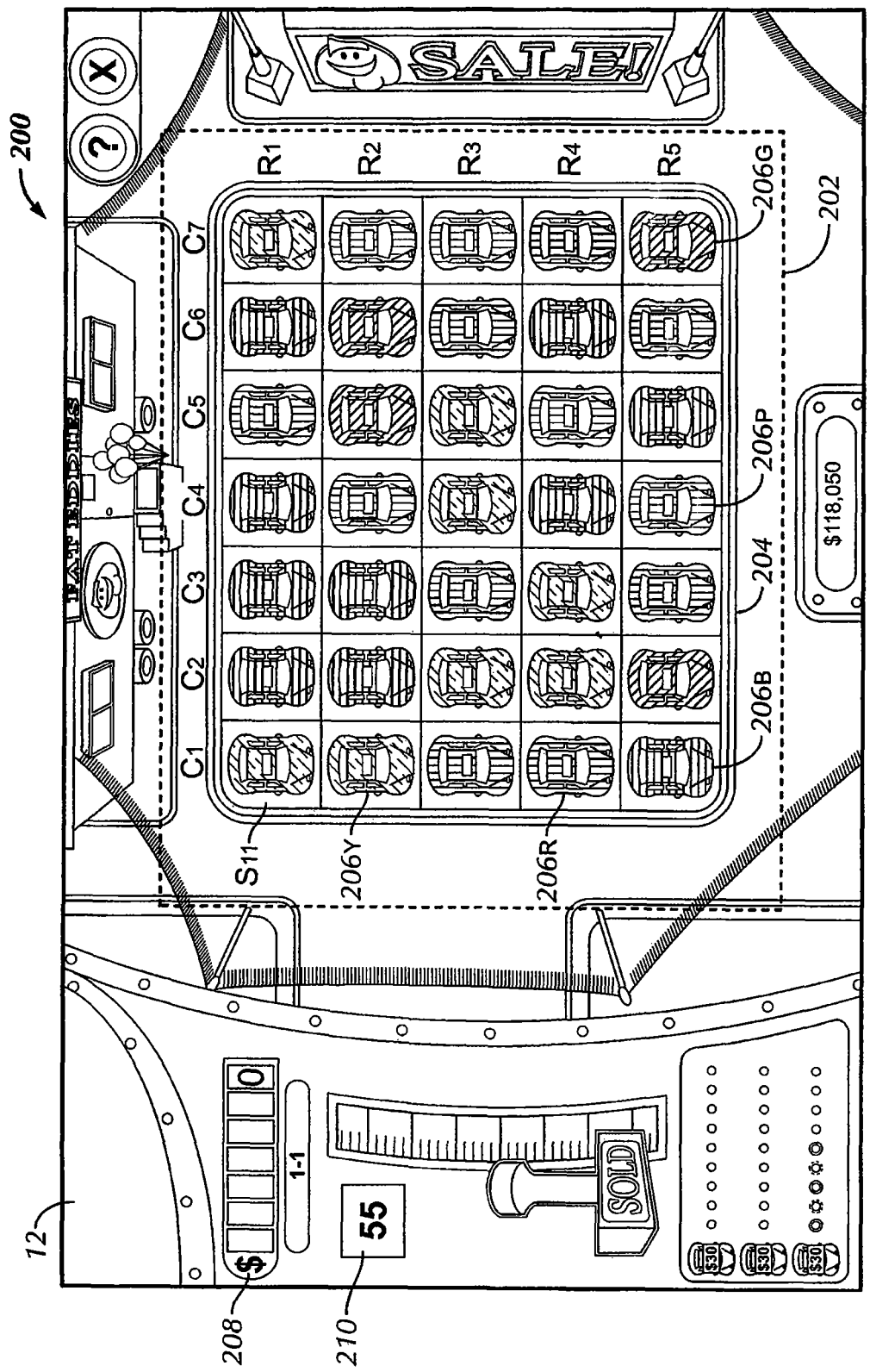
FIG. 2 is a screenshot of an electronic game in accordance with a preferred embodiment of the present invention.

FIG. 2 is a screenshot 200 of an electronic game playable in an amusement device 10 in accordance with a preferred embodiment of the present invention. The game includes a playing area 202 within the display 12. The playing area includes a grid 204 formed of a plurality of rows $R_M$ and a plurality of columns $C_N$ defining individual gaming spaces $S_{MN}$. Although the grid 204 in FIG. 2 is shown as having five rows $R_M$ and seven columns $C_N$, any number of rows $R_M$ and columns $C_N$ may be used to create a desired number of spaces $S_{MN}$. The grid 204 in FIG. 2 is shown as a parking lot in a preferred embodiment, but the grid 204 may be a simple grid or be represented as any grid-type structure, such as a chess board, city blocks, or the like.

The game further includes a plurality of game objects 206. The game objects 206 are preferably vehicles, such as cars as shown in FIG. 2. However, other vehicles may be used, such as trucks, motorcycles, bicycles, boats, planes, trains, buses, scooters, blimps, rockets, sleds, submarines, hovercrafts, or the like. The game objects 206 may also be non-vehicles, such as shapes, cards, animals, plants, indicia, toys, machines, books, pictures, or the like. One game object 206 is disposed within each of the gaming spaces $S_{MN}$ for selection and movement by the player.

Each game object 206 has at least a first identifier selected from a predetermined set of identifiers. For example, the first identifier may be a color. In the example shown in FIG. 2, each game object 206 is one of red ($206_R$), green ($206_G$), blue ($206_B$), yellow ($206_Y$), or purple ($206_P$). However, the first identifier may also be selected from sets of shapes, sizes, models (such as car models or the like), breed (e.g., cat, dog, or the like), orientation (e.g., upside-down, mirrored, or the like). The game objects 206 may also include a second or more identifiers selected from a predetermined set of second identifiers. For example, red cars $206_R$ may also have a distinct shape.

The electronic game includes a set of rules which dictate playing and scoring of the game. The rules include selecting at least one of the plurality of game objects 206 and moving the selected game object 206 from a first gaming space $S_{MN}$ to a second gaming space $S_{MN}$ within the same row $R_M$ or column $C_N$ as the first gaming space $S_{MN}$. The unselected game objects 206 disposed within the same row $R_M$ or column $C_N$ are also automatically moved a corresponding number of spaces within the same row $R_M$ or column $C_N$ as the selected game object 206. For example, with respect to FIG. 2, the player may wish to move the green car $206_G$ in gaming space $S_{57}$ three spaces up to gaming space $S_{27}$. The player can perform this task by touching and dragging the selected car $206_G$ on the display 12. As a result of this action, the car $206_R$ in gaming space $S_{47}$ will automatically be moved three spaces up to gaming space $S_{17}$. The car $206_B$ in gaming space $S_{37}$ must come back around to gaming space $S_{57}$, since it cannot move three spaces upwardly, and so forth. Likewise, the cars $206_Y$ and $206_R$ in gaming spaces $S_{17}$ and $S_{27}$, respectively, will automatically come back around to gaming spaces $S_{37}$ and $S_{47}$, respectively.

As a result of the ability of the touchscreen 12 to simultaneously receive a plurality of touch inputs, the player is able to select and move a plurality of game objects 206, each disposed in gaming spaces $S_{MN}$ in different rows $R_M$ or columns $C_N$, simultaneously. For example, simultaneous with moving the green car $206_G$ in gaming space $S_{57}$ to gaming space $S_{27}$, the player could also move the yellow car $206_Y$ in gaming space $S_{43}$ up one space to gaming space $S_{33}$. Faster gameplay and more complex scenarios may be achieved by this configuration.

The rules further include achieving a match by moving selected game objects 206 such that a predefined number of, preferably three or more, game objects 206 having the same first identifier selected from the predetermined set of first identifiers are disposed in adjacent spaces $S_{MN}$ within a common row $R_M$ or column $C_N$. For example, in the moves described above, the player has created a match of three green cars $206_G$ in the second row $R_2$ (spaces $S_{25}$-$S_{27}$) and four yellow cars $206_Y$ in the third row $R_3$ (spaces $S_{32}$-$S_{35}$).

The rules further include automatically clearing the game objects 206 disposed in the adjacent spaces $S_{MN}$ after a match is achieved, and then replacing the cleared game objects 206 with new game objects 206. Each new game object 206 has a first identifier selected from the predetermined set of first identifiers. For example, the matched green cars $206_G$ in spaces $S_{25}$-$S_{27}$ are cleared and replaced by three new cars 206, which may be red, blue, and yellow. Points are scored during a run of play, wherein a run of play is a duration of time when the player can obtain matches by selecting and moving the game objects 206 within the grid 204. The game may proceed in rounds, wherein, for example, the player may only proceed to the next round by obtaining a certain number of matches in an allotted time.

As seen in FIG. 2, the game may also include a total score indicator 208 disposed proximate to or within the playing area 202. The total score is preferably incremented or decremented based at least in part on the number of matches obtained by the player during a run. The total score may also be incremented or decremented based on the number of game objects 206 involved in a match obtained by the player. For example, four cars 206 in a match are worth more than three cars 206 in a match. The game may also include a timer 210 disposed proximate to or within the playing area 202. The timer 210 is incremented or decremented to indicate to the player the amount of time remaining during a run of play. Other features may be added to enhance the game experience.

The amusement device 10 may also include other functionality and features such as music jukebox, video jukebox, multimedia player, Internet browsing, broadcast media viewing, time based rental mode, non-prize tournaments, prize-based tournaments, head-to-head competitions, prize-based lotteries, ticket dispensing, prize dispensing, debit/credit card charging, phone card dispensing, e-mail, photography, placing customer orders, communicating with other amusement devices, and the like.

The amusement device 10 may also provide for remote or local access for accounting and/or bookkeeping purposes. The amusement device 10 may include a local connector for uploading to a hand-held or portable computer or removable memory for receiving accounting or other data. The amusement device 10 may include accounting and bookkeeping screens accessible by an operator through set up screens and/or through password protection.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A non-transitory computer-readable storage medium storing thereon computer-executable instructions for an electronic video game, the computer-executable instructions, when executed by a processor, configure the processor to:
    display, on a display device of an amusement device comprising a touchscreen, a play area, the play area including a plurality of rows and a plurality of columns which form a grid having a plurality of gaming spaces;
    display, on the play area of the display device, a plurality of game objects, each of the plurality of game objects having a first identifier from a predetermined set of first identifiers, each of the plurality of game objects being disposed within respective ones of the plurality of gaming spaces;
    receive simultaneous touch inputs from a player contacting the touchscreen of the display device, to select at least a first one of the plurality of game objects in a first row or first column and at least a second one of the plurality of game objects in a second row or second column;
    simultaneously (i) move, in the play area of the display device, the first selected game object from a first gaming space of the plurality of gaming spaces to a second gaming space of the plurality of gaming spaces within the first row or first column as the first selected game object, all unselected game objects disposed in gaming spaces of first row or first column being automatically moved a first corresponding number of gaming spaces within the first row or first column as the first selected game object, and (ii) move, in the play area of the display device, the second selected game object from a third gaming space of the plurality of gaming spaces to a fourth gaming space of the plurality of gaming spaces within the second row or second column as the second selected game object, all unselected game objects disposed in gaming spaces of second row or second column being automatically moved a second corresponding number of gaming spaces within the second row or second column as the second selected game object, wherein the second gaming space and the fourth gaming space are simultaneously selected by the player using the touchscreen;
    determining a match is achieved when a predetermined number of game objects having the same first identifier are disposed in a predetermined number of adjacent gaming spaces within a same row of the plurality of rows or a same column of the plurality of columns; and
    automatically (i) clearing the game objects disposed in the adjacent gaming spaces for which a match is achieved, and (ii) replacing the cleared game objects with new game objects, each new game object having a first identifier selected from the predetermined set of first identifiers.

2. The non-transitory computer-readable storage medium of claim 1, wherein the game objects are vehicles.

3. The non-transitory computer-readable storage medium of claim 2, wherein the vehicles are at least one of cars, trucks, motorcycles, bicycles, boats, planes, trains, buses, scooters, blimps, rockets, sleds, submarines, and hovercrafts.

4. The non-transitory computer-readable storage medium of claim 2, wherein the grid is a parking lot.

5. The non-transitory computer-readable storage medium of claim 1, wherein scoring of the electronic video game includes scoring points based at least in part on achieving matches.

6. The non-transitory computer-readable storage medium of claim 5, wherein the processor is configured to display, on the display device, a total score indicator disposed proximate to or within the play area, the total score being incremented or decremented based at least in part on the number of matches achieved by the player.

7. The non-transitory computer-readable storage medium of claim 6, wherein the total score is also incremented or decremented based on the number of game objects involved in a match achieved by the player.

8. The non-transitory computer-readable storage medium of claim 1, wherein the game objects are one of shapes, cards, animals, plants, indicia, toys, machines, books, and pictures.

9. The non-transitory computer-readable storage medium of claim 1, wherein the first identifier is one of a color, shape, size, model, breed, and orientation.

10. The non-transitory computer-readable storage medium of claim 1, wherein each of the game objects also has a second identifier selected from a predetermined set of second identifiers.

11. The non-transitory computer-readable storage medium of claim 1, wherein the processor is configured to display, on the display device, a timer disposed proximate to or within the play area, the timer being incremented or decremented to indicate to the player an amount of time remaining during a run of play, a run of play being a duration of time when the player can achieve matches by selecting and moving the game objects within the grid.

12. The non-transitory computer-readable storage medium of claim 1, wherein the predetermined number of game objects is three or more game objects.

* * * * *